Jan. 10, 1961 J. P. URBON 2,967,558
RUBBER VALVE
Filed Oct. 20, 1958 2 Sheets-Sheet 1
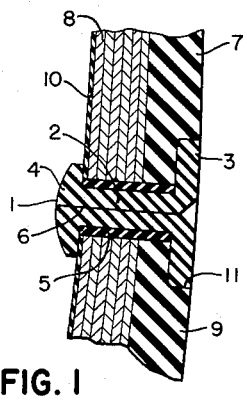
FIG. 1
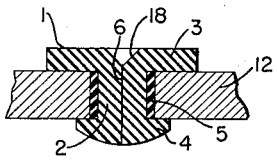
FIG. 2
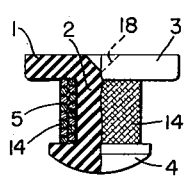
FIG. 7
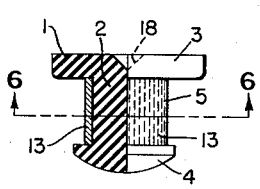
FIG. 5
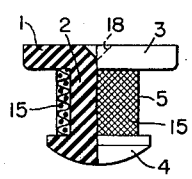
FIG. 8
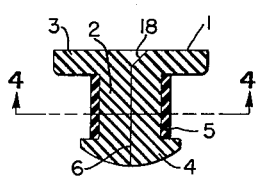
FIG. 3
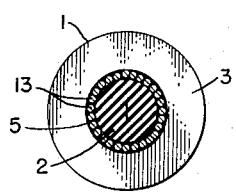
FIG. 6
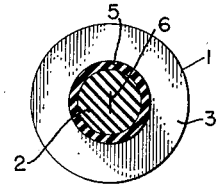
FIG. 4
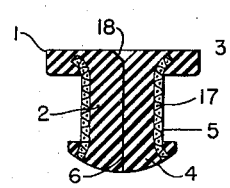
FIG. 9
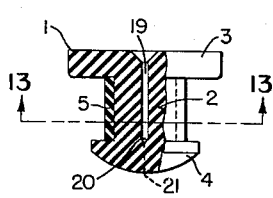
FIG. 12
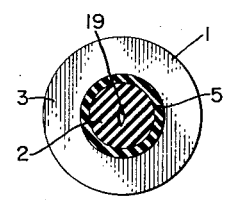
FIG. 11
FIG. 10
FIG. 13
INVENTOR.
JOHN P. URBON
BY
ATTORNEY Jan. 10, 1961

J. P. URBON 2,967,558

RUBBER VALVE

Filed Oct. 20, 1958

INVENTOR.
JOHN P. URBON

BY

*K. L. Miller*
ATTORNEY

United States Patent Office 2,967,558
Patented Jan. 10, 1961

---

2,967,558

RUBBER VALVE

John P. Urbon, Cuyahoga Falls, Ohio, assignor to The Goodyear Tire & Rubber Company, Akron, Ohio, a corporation of Ohio Filed Oct. 20, 1958, Ser. No. 768,477

17 Claims. (Cl. 152—429)

The present invention relates to rubber valves, mounted in an opening in the wall of an inflatable chamber, and a primary object of the invention is to protect the surface of the valve engaging the wall of such an opening against any abrasion or cutting action the wall may have on the valve. The invention is illustrated as applied to a tubeless tire and rim combination in which either the tire or the rim may be provided with such a valve-receiving opening and a valve arranged therein, such valves being normally under considerable compression whereby to close an inflation passage therethrough.

Another object of this invention is to provide the shank of a rubber valve with an outer sheath or veneer which has greater resistance to cutting and abrasion than the material forming the portion of the shank immediately adjacent the inflation passage therethrough, the latter material being relatively soft and pliable so as to satisfactorily seal the passage when the valve is compressed in the opening in the wall of the inflatable chamber. Most materials used for this latter purpose are prone to cutting or abrasion and may result in the valve losing its usefulness in one of several ways. First, a cutting action will tend to sever the shank and permit severed portions to be ejected from the opening. Severe abrasion of the valve will tend to reduce the compression in the valve and eventually cause leakage of air from the inflated article.

Still another object of the invention is to provide the valve with a reinforcing sheath which will not interfere with the normal compression and elongation of the valve when inserted within such an opening. As will appear later, the sheath itself need not necessarily elongate but it must be capable of reduction in diameter.

Other objects and advantages of the invention will appear hereinafter as the description proceeds, the novel features, arrangements and combinations being clearly pointed out in the specification and appended claims.

In the drawings:

Fig. 1 is a cross-section through the wall of a tire equipped with a valve having a soft rubber shank and having a protecting rubber sheath;

Fig. 2 is a cross-section through a tire rim equipped with such a valve;

Fig. 3 shows a cross-section of the valve in Fig. 1 in its uncompressed shape outside the opening in the tire;

Fig. 4 is a cross-section taken on the line 4—4 of Fig. 3;

Fig. 5 is a view similar to Fig. 3 in which the sheath comprises a layer of wire embedded in rubber;

Fig. 6 is a cross-section taken on the line 6—6 of Fig. 5;

Figs. 7, 8, 9, 10 and 11 are cross-sections of valves provided with various types of sheaths using strands, cords, flocculent material or other reinforcing material;

Fig. 12 is a view, partly in cross-section showing an alternate form of inflation opening;

Fig. 13 is a cross-section taken on the line 13—13 of Fig. 12;

Figure 14:
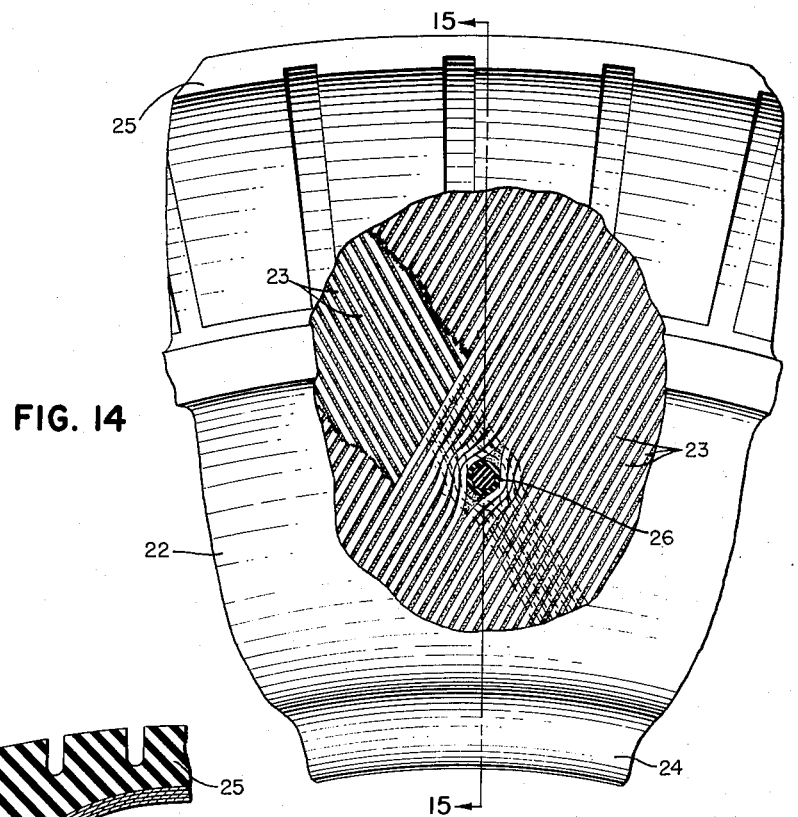
Fig. 14 is a side view of a portion of the tire wall showing the cord layers adjacent the opening in the tire wall.

Recent developments in the tire industry have required the placing of a valve in the sidewall of a tire. An all-rubber valve has been found to be suitable for this purpose and such valves are generally provided with a longitudinal passage through which a hollow inflation needle may be passed to introduce air into the chamber formed by the tire and rim. Since the rubber valve is placed under high compression when inserted in the opening in the side of the tire, this passage is normally closed to seal the air in the chamber, but, due to the yieldability of the rubber in the valve, a slender inflation needle may be passed through the opening in a manner well understood in the art.

A rubber valve of this kind should be made of a rubber stock compounded so that it will be relatively pliable and resilient to permit easy compression thereof when inserting the valve in the opening of the wall of the chamber. Such a rubber stock is not ordinarily sufficiently cut and abrasion resistant to resist the cutting and abrasive action of the tire cords, with the result that the cords may cut through the rubber sufficiently to cut the valve in two or to so weaken it that when inserting or retracting the inflating needle one or both portions of the valve may be dislodged from its position in the opening in the tire. If this happens, then all of the air may be lost from the tire itself. In fact, if the valve were so weakened, the valve might easily be dislodged during normal operation of the tire and the effect would be similar to that of a blowout.

In order to overcome these disadvantages, this invention provides a reinforced sheath for the rubber valve to resist the cutting and abrading action of the cords, or wall of a rim opening.

Fig. 1 shows a valve 1 having a shank 2 provided with an enlarged head 3 and an inner enlarged end 4, the shank being provided with a sheath 5 to protect the shank from the cutting and abrasive action of the wall of the opening in which the valve is mounted. The valve may have a pre-formed air passage 6 therethrough for the reception of an inflation needle or tube commonly used with valves of this general nature. Since the valves in each of the modifications shown in the drawings are substantially the same in all views except for the nature of the sheath, the numerals 1, 2, 3, 4, 5 and 6 will be used to designate the similar parts in the other views.

In Fig. 1 the sheath 5 is made of a rubber that is compounded to offer very high resistance to abrasion and cutting but is still pliable enough to permit radial compression and elongation thereof. The valve, except for the sheath, is compounded so that it will be more pliable and resilient than the sheath so that when compressed it will close the valve passage and yield readily to the passage of an inflation tube therethrough. It must also be of rubber which will operate at very low temperatures as well as at normal or high temperatures. If the rubber hardens at low temperature, it may prevent easy insertion of the inflation needle or may even be abraded by the needle—thus causing leakage of air from the chamber.

The tire carcass 7 is provided with several layers of cord fabric 8, the cords adjacent the opening in which the valve is inserted tending to cut through the valve as will be described later in connection with Figs. 14, 15 and 16. In addition, the outer wall 9 is formed by a layer of rubber and a thin layer of rubber forms the inner wall 10. The outer wall 9 is recessed at 11 to receive the head 3 so that the outer surface thereof is flush with that of the outer wall.

In Fig. 2 the valve is shown as applied to an opening in a rim 12 but otherwise the valve is constructed the same as in Figs. 1, 3 and 4, except that the valve as shown is not as long due to the relatively lesser thickness of the rim. Of course, it will be understood that the opening in the rim could be built up to accommodate a valve of the general proportions shown in Fig. 1. In Fig. 2, the sheath 5 is made the same as in Fig. 1.

In describing the invention, a valve made to fit the wall of the tire will be described, it being understood that the same construction may be employed in a valve to be used in an opening in a rim.

In Figs. 5 and 6 the sheath 5 is formed of parallel lengths of wire 13 extending generally parallel to the axis of the shank 2. These wires are closely spaced to provide a protecting wall but they are preferably not touching each other so that when the shank is compressed radially as when placed in the valve-receiving opening in the tire, the wires may move closer together. These wires may be bonded in the soft rubber of the shank or if desired in a separate, preferably harder layer of rubber forming the body of the sheath. The harder rubber is not necessarily required because the wires themselves offer sufficient resistance to cutting and abrasion. Of course, the wires are preferably bonded to the rubber and, when the valve elongates, while being placed in the opening in the tire, the rubber of the shank may stretch although the wires themselves do not stretch. This is not an unpractical solution to the problem but does offer the drawback that the bond between the rubber and the valve may be destroyed or impaired. This would not matter particularly, however, since the rubber is under high compression and the rubber would seal against the wires and prevent the escape of air.

In Fig. 7, the sheath 5 is formed of spirally laid cords 14. At least one and preferably two or more layers may be employed. If two or more layers are used, the cords in the one layer should be spiralled oppositely to those of the other layer. In Fig. 8 the sheath is formed of square woven fabric 15 laid on a bias about the shank. In Fig. 9, the sheath 5, whether constructed of cords as in Fig. 7 or of square woven fabric as in Fig. 8 extends not only around the shank of the valve but also around the bottom and sides of the head 3. This adds additional strentgh to the valve in a longitudinal direction so that when inserting or removing the valve from the opening in the tire it is unlikely that the valve will be pulled apart or that the head will become separated from the shank.

Fig. 10 shows the sheath 5 incorporating flocculent material 16, the flocculent material having the greatest dimension extending generally lengthwise of the shank. In using such flocculent material it is preferable in this case to use the harder rubber in the sheath with the flocculent material embedded in the harder rubber.

In Fig. 5, the wires which form the sheath are preferably single stranded wires or if cabled or containing multiple strands the same should be thoroughly impregnated with rubber to prevent passage of air through the interstices formed by such a wire structure. Instead of using wire, cords may be employed and preferably monofilament cords of synthetic material should be used.

In Figs. 7, 8 and 9, the cords shown should preferably be monofilament cords of rayon or nylon for example. However, wire may be used in place of the cords and longitudinal extension and radial compression are permitted by their helical arrangement. The longitudinal extension is not interfered with since the cords merely take a lesser helical angle to the longitudinal axis when the valve is extended under compression. The cords in Figs. 7, 8 and 9 are preferably initially laid at an angle of about 45°, although this angle is relatively unimportant except that it should be sufficient to permit the necessary axial elongation.

In Fig. 10, the flocculent material is preferably a stranded monofilament material but may be of any other material that has high resistance to abrasion and cutting. In Fig. 11, the sheath 5 is shown with a single layer of spirally wound cords or wire 17, but any of the other materials used in the previously described views could be employed, although the arrangement of the wires in Fig. 5 would not be as desirable for the form of the invention shown in Fig. 11 since the sheath 5 is shown as extending a substantial distnace into the body of the head and also into the enlarged inner end of the valve. Such a construction minimized the chances that the valve may be torn apart or ruptured during insertion and removal of the valve for the same reasons as given in connection with the form of the invention shown in Fig. 9.

The valves shown in Figs. 5–11 inclusive are all shown in their unstressed condition outside the valve opening in the tire or wall of the inflatable article. As will be noted, it is of greater diameter and shorter than when compressed as shown in Fig. 1 because when the valve is inserted in the opening it must be compressed radially in order to fit the opening and this causes axial extension thereof. The head of the valve is preferably made the same size as the recess 11 or perhaps slightly larger than the recess so that it also will be compressed when it is received in the recess 11. The enlarged end 4 on the valve helps to prevent accidental retraction of the valve from the opening.

It will be noted in Figs. 1–11 inclusive that the opening in the valve is preformed and comprises a longitudinal slit extending from one end of the valve to the other and at the outer end of the slit there is provided a normally open recess 18 which assists in guiding the inflation needle into the slit. Such a valve, however, may require a special tool for insertion. Such a tool could be used to engage a shoulder at the enlarged end 4 and the valve could then be pulled into the opening. A string or looped wire could also be placed around the shank of the valve and used to pull the valve into the opening, all as is well understood in the prior art.

However, in order to provide means to facilitate the insertion of the valve the inflation passage is formed incompletely as shown in Figs. 12 and 13. This inflation passage 19 as shown in Figs. 12 and 13 is formed by a relatively flat pin having a cross-section to form an opening such as illustrated in these figures. Such an opening can be employed in all forms of the invention shown and preferably has a cross-section longer in one direction than the other so that upon compression the opposed walls move together to seal the passage. The passage 19, however, only extends to the point 20 and, when it is desired to mount the valve in the opening in the tire, it is only necessary to insert a slender but blunt rod into the opening 19, and by pushing on the rod stretch the rubber valve to force it into the opening in the tire. After it is mounted as in Fig. 1, a slender, sharp cutting tool is inserted into the passage 19 to cut the passage through to the other end of the valve along the dotted line indicated at 21. Such an arrangement is also well understood in the art. In order to simplify the language used in the claims, it will be understood that the words "inflation passage" mean an inflation passage completely formed in the uncompressed valve itself or one which is only partially formed initially but which is later completely formed.

Figure 15:
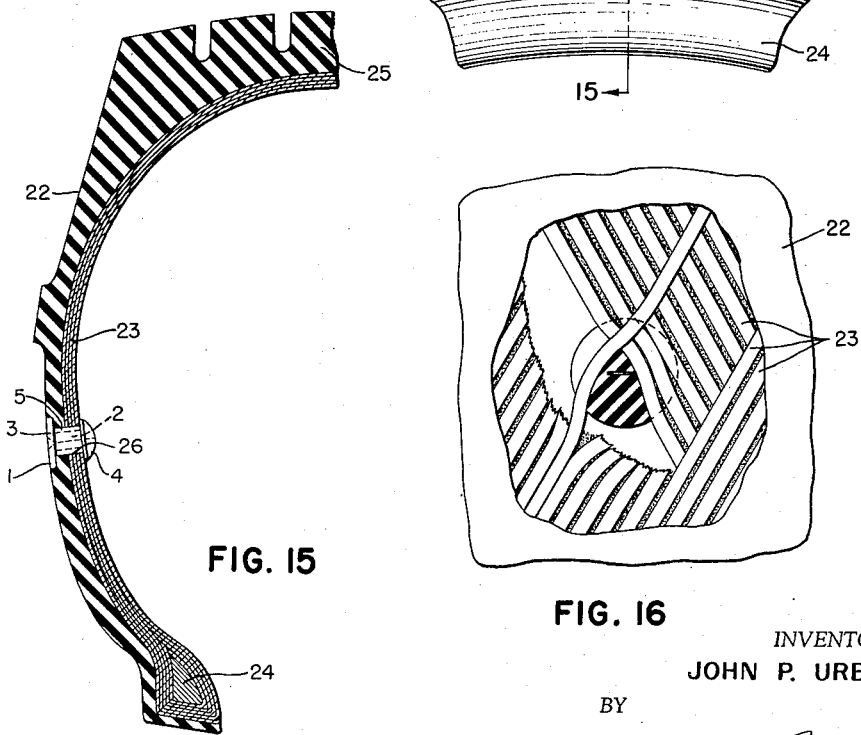
Fig. 15 is a cross-section taken on the line 15—15 of Fig. 14.
Figure 16:
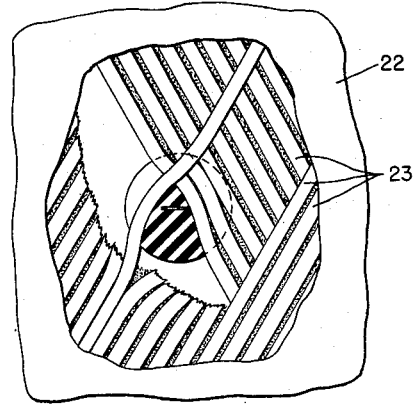
Fig. 16 shows the action of the cords on a soft rubber valve not provided with a protecting sheath.

Figs. 14, 15 and 16 illustrate, more or less schematically, the manner in which the cords in a tire tend to cut the valve. Fig. 14 shows a tire 22 having two or more layers of cords 23 laid at opposite angles in adjacent layers and extending from one bead 24 across the tread 25 of the tire to the other bead 24 as is customary in the manufacture of most tires. Before the tire is vulcanized, an opening 26 is formed in the sidewall of the tire by pressing a pin through the wall of the tire between the cords and in so doing the cords adjacent the pin are spread apart and assume a non-regular path as illustrated in Fig. 14. Then the tire is vulcanized with the pin still in place and these cords then assume a more or less permanent position as illustrated. When the vulcanized tire is put into use and is operated under load and cords 23, which are deflected around the opening 26, tend to straighten out with the result that these cords tend to cut through the valve in the manner illustrated in Fig. 16. Such cutting action may eventually cause a complete severence of the rubber valve into two parts or so weaken the rubber valve that the flexing action of the sidewall of the tire may cause portions of the valve to separate and later be ejected from the opening 26. Such ejection of the valve from the opening would result in a tire failure similar to a blowout. This cutting action also destroys the imperviousness of the valve structure itself and may reduce the compression in the valve with the result that there is more opportunity for the chamber to lose some of its air because of the loss of compression in the valve.

In the case of a valve used as disclosed in Fig. 2, the cutting or abrading action of the wall of the rim may destroy the compression sufficiently to permit loss of air from the chamber or cause the valve to be ejected from the opening under the pressure existing within the tire.

Basically speaking, the invention resides in providing an inflatable chamber with a valve mounted in an opening in the wall thereof, the valve being principally all rubber and compressed within the opening to seal an inflation passage therethrough with a protecting sheath around the outer part of the valve to minimize any abrasion or cutting of the valve because of the material in the wall surrounding the opening. Several embodiments of the invention have been disclosed in which various materials are used in the sheath but they all serve the same purpose, namely, to protect the valve against cutting and abrasion. It is to be understood that the invention is not limited to having the sheath precisely at the outer periphery of the valve but it should be located generally in the vicinity of the outer periphery. The outer surface of the sheath should be of such a character that it will conform readily to the opening and provide a satisfactory air seal between the valve and the opening. In order to accomplish this result, materials such as cords, wires, flocculent material etc. should have a coating of rubber between them and the outer periphery of the valve.

As used in the claims the term "rubber" means natural rubber, synthetic rubber and other materials having similar properties for the purposes described. The term "cord," except where otherwise qualified, includes wire cord, cotton, rayon, nylon and the like whether such cords are single strands, cabled, braided or otherwise formed.

While certain representative embodiments and details have been shown for the purpose of illustrating the invention, it will be apparent to those skilled in the art that various changes and modifications may be made therein without departing from the spirit or scope of the invention.

Having thus fully described my invention, what I claim and desire to secure by Letters Patent of the United States is:

1. An inflation valve for mounting in an opening in a wall of a fluid container, said valve comprising a shank having a normal cross-section greater than that of the opening in which it is to be mounted, said shank comprising a central portion formed of relatively soft pliable rubber having an inflation passage and a sheath integral therewith arranged radially outward of said central portion and having a substantially greater resistance to cutting and abrasion than the rubber of said central portion, said shank being radially compressible and longitudinally extensible to permit mounting in said opening.

2. A valve as set forth in claim 1 in which the sheath comprises a layer of rubber.

3. A valve as set forth in claim 1 in which the sheath comprises a layer of cords.

4. A valve as set forth in claim 1 in which the sheath comprises a layer of monofilament cords.

5. A valve as set forth in claim 1 in which the sheath comprises a layer of nylon monofilament cords.

6. A valve as set forth in claim 1 in which the sheath comprises a layer of cords helically arranged about the central portion.

7. A valve as set forth in claim 1 in which the sheath comprises a layer of wire cords helically arranged about the central portion.

8. A valve as set forth in claim 1 in which the sheath comprises a layer of cross-woven fabric laid on the bias.

9. A valve as set forth in claim 1 in which the sheath comprises at least two layers of cords.

10. A valve as set forth in claim 1 in which the sheath comprises at least two layers of cords helically wound at opposite angles about the central portion.

11. A valve as set forth in claim 1 in which the sheath comprises flocculent material distributed throughout the rubber in said shank.

12. A valve as set forth in claim 1 in which the sheath comprises short lengths of wire extending generally parallel to the longitudinal axis of said shank and bonded to the rubber in said shank.

13. A valve as set forth in claim 1 in which the sheath extends substantially from one end of said shank to the other.

14. A valve as set forth in claim 1 in which the shank is provided with an enlarged head and in which the sheath extends substantially from one end of the shank to the other and into the enlarged head.

15. A valve as set forth in claim 14 in which the sheath follows the outer contour of the shank and the head at the outer circumferential surfaces thereof.

16. A valve as set forth in claim 1 in which the central portion and the sheath are arranged concentrically about the inflation passage and in which the cross-section of the shank is generally circular.

17. A valve as set forth in claim 1 in which the sheath comprises a layer of inextensible cords helically arranged about the central portion.

References Cited in the file of this patent

UNITED STATES PATENTS

| | | |
|---|---|---|
| Re. 17,057 | Voit | July 31, 1928 |
| 1,160,168 | Henderson | Nov. 16, 1915 |
| 1,236,534 | Blodgett | Aug. 14, 1917 |
| 2,130,096 | Lanie | Sept. 13, 1938 |
| 2,261,833 | Kreyer | Nov. 4, 1941 |
| 2,318,115 | Tubbs | May 4, 1943 |
| 2,401,950 | McMahan | June 11, 1946 |
| 2,690,461 | Steeves | Sept. 28, 1954 |

OTHER REFERENCES

"Tires—TBA Merchandising," June 1956, page 47.